Figure 1:
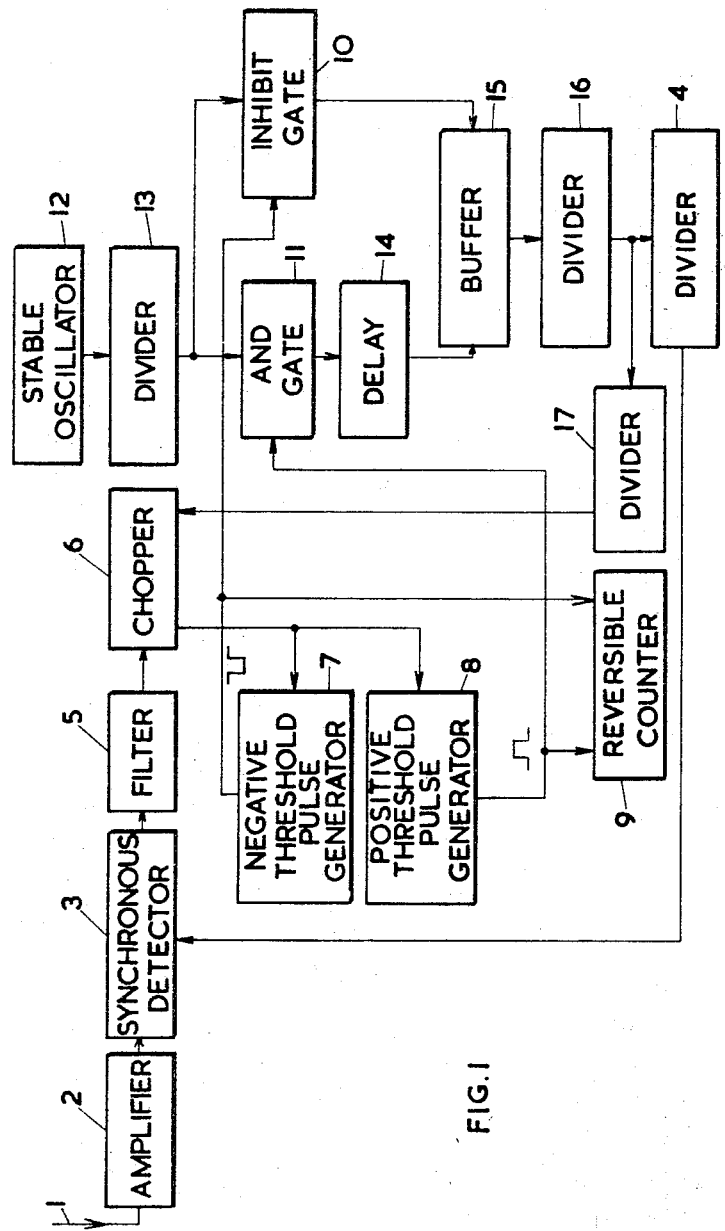

May 30, 1967  D. SOUTHERN  3,323,053
DIGITAL OUTPUT PHASE METER
Filed Feb. 20, 1964  2 Sheets-Sheet 1

DAVID SOUTHERN
*Inventor*
By Moore, Hall + Pollock
*Attorney*

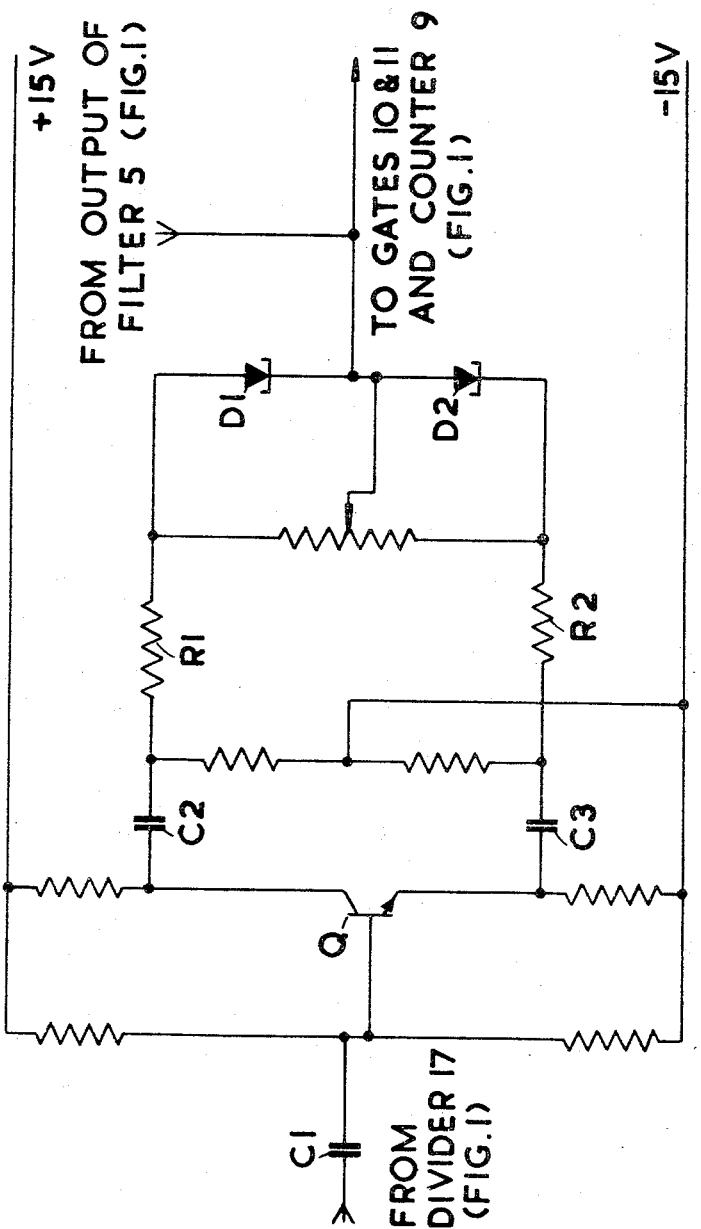

United States Patent Office 3,323,053
Patented May 30, 1967

3,323,053
DIGITAL OUTPUT PHASE METER
David Southern, Godalming, England, assignor to Minister of Aviation, in Her Majesty's Government of the United Kingdom of Great Britain and Northern Ireland, London, England
Filed Feb. 20, 1964, Ser. No. 346,296
Claims priority, application Great Britain, Feb. 26, 1963, 7,624/63
6 Claims. (Cl. 324—83)

The present invention relates to phase measuring circuits, and is more particularly concerned with a novel phase meter having a digital output. Phase meter circuits have a considerable application in the measurement of the phase of a received signal on a time scale established by a highly stable oscillator as in certain radio navigation systems operating in the very low frequency (V.L.F.) range. A requirement of such circuits is that they should be extremely stable in phase and, if they are to be carried in aircraft, they should be light in weight and compact in form.

Known phase measuring circuits employed for phase measurement at V.L.F. include mechanical servo mechanisms to track changes in phase. Such servo mechanisms tend to be unreliable in operation.

It is an object of the present invention to provide a phase measuring circuit, suitable for phase measurement at very low frequencies, of improved reliability.

According to the present invention, there is provided a phase measuring circuit comprising means, including a frequency divider chain, for converting a signal input to the divider chain into an output signal having a fundamental frequency lower than that of the input signal. The phase measuring circuit also comprises a synchronous detector to one input of which the output signal is applied, integrator means for integrating the output of the synchronous detector, and pulse generator means for adding pulses to, or for inhibiting pulses normally occurring at, some point on the divider chain according to whether the output from the integrator means is respectively greater than or less than (or vice versa) a preselected threshold level. Accumulator means are provided for storing the difference between the number of pulses added and the number of pulses inhibited.

In order that the invention may be more clearly understood, an embodiment thereof will now be described with reference to the accompanying drawings, in which:

FIGURE 1 is a block circuit diagram of a digital phase meter constructed in accordance with the present invention, and FIGURE 2 is a circuit diagram of a modification of part of the circuit shown in FIGURE 1.

The drawing shows an aerial 1 which feeds a wideband radio-frequency amplifier 2. The output of the amplifier 2 is applied to a synchronous detector 3 in which the amplified received signal is, in effect, multiplied with the output of a divider 4. The output of the synchronous detector 3 is integrated in an integrator comprising a resistance-capacity filter 5 having a time-constant of approximately ten seconds. The output of the filter 5 is sampled approximately ten times per second by a chopper 6, and the sampled output is applied to two threshold pulse generators 7 and 8. The threshold pulse generators 7 and 8 may comprise Schmidt triggers. Threshold pulse generator 7 is called the negative threshold pulse generator, and is arranged to emit a pulse whenever the output voltage of the filter 5 sampled by the chopper 6 is negative to a preselected threshold voltage level, such as ground potential. Threshold pulse generator 8 is called the positive threshold pulse generator, and is arranged to emit a pulse whenever the output voltage of the filter 5 sampled by the chopper 6 is positive to the same threshold level. This preselected threshold level is preferably chosen to lie midway between the maximum positive and negative output voltages which could be obtained from the filter 5.

Output pulses from the threshold pulse generators 7 and 8 are applied to two separate inputs of a reversible counter 9. The output pulses from the negative threshold pulse generator 7 are also applied to an inhibit gate 10, and the output pulses from the positive threshold pulse generator 8 are applied to an AND (or coincidence) gate 11. The inhibit gate 10 is normally open, and the AND gate 11 is normally closed, except when a pulse is applied thereto.

A highly stable oscillator 12 generates oscillations at a frequency of 10 mc./s. These oscillations are applied to a divider circuit 13 which has a pulse output at a repetition rate of 5 million pulses per second. The output of the divider 13 is applied to the AND gate 11 and to the inhibit gate 10. The output of the AND gate 11 is applied through a delay 14 to a buffer 15 in which it is combined with the output of the inhibit gate 10. The output of the buffer 15 is applied to a divider 16 which is arranged to emit a pulse once for every fifty pulses applied to its input. The output of divider 16 is applied to a further divider 4 which generates a square-wave output. The output of the divider 16 is also applied to a still further divider 17 which applies a pulse to the chopper 6 to operate it once every ten thousand pulses from the output of the divider 16.

The operation of the circuit hereinbefore described with reference to the drawing will now be described. The divider 13 generates pulses at a pulse recurrence frequency of five million pulses per second; that is to say, it generates pulses at half the frequency of the oscillator 12. These pulses normally pass through the gate 10 and the buffer 15 to the divider 16. The divider 16 reduces the pulse rate by one-fiftieth, so that the pulse recurrence frequency at its output is normally 100,000 pulses per second. The divider 4 includes means responsive to these pulses for generating a square-wave voltage having a fundamental frequency of, say, 16 kc./s. The nature of the circuit arrangement, the operation of which has been thus far described, is such that the frequency-ratio between the fundamental frequencies at the output of the divider 4 and at the output of the stable oscillator 12 is constant.

The output of the divider 4 is applied to the synchronous detector 3 wherein it is multiplied by the output of the amplifier 2. Now, let it be assumed that a signal having a frequency of 16 kc./s. is being received by the aerial 1 and is amplified by the amplifier 2. This signal will then be coherent with the output of the divider 4. The synchronous detector 3 will then give an output which is dependent in amplitude and sign on the phase difference between the received signal and the fundamental frequency of the square-wave signal at the output of the divider 4. The integrating filter 5, having a long time-constant, will integrate this output to give a substantially direct voltage, the magnitude and sign of which is dependent on the relative phases of the two signals at the input of the synchronous detector 3. At the same time, the filter 5 will discriminate against other signals received by the aerial 1 of dissimilar frequency to that of the signals at the output of the divider 4 because the consequent "beat" signals at the output of the synchronous detector 3 will have a period short compared with the time-constant of the filter 5.

The chopper 6 is operated by the output of divider 17, to pass the output voltage of the filter 5 to the threshold pulse generators 7 and 8, at a rate of normally ten times per second, this being one ten-thousandth of the pulse recurrence rate at the output of the divider 16. If the output voltage of the filter 5 sampled by the chopper 6 is more negative than the threshold voltage of the threshold pulse generators 7 and 8, only the negative threshold pulse generator 7 will emit a pulse. This pulse is of such a length that it embraces the time of occurrence of the next-following pulse from the divider 13 and prevents its passage through the inhibit gate 10. The output of the divider 4 will, therefore, be retarded by 0.2 microsecond. This represents a change of phase of 1.152 degrees at a frequency of 16 kc./s. The pulse from the negative threshold pulse generator 7 is also applied to the reversible counter 9 to reduce its count by one unit. This unit reduction represents a phase retardation of 1.152 degrees in the signal of 16 kc./s. frequency received at the aerial 1 on the time scale established by the stable oscillator 12. Conversely, if the output voltage of the filter 5 sampled by the chopper 6 is more positive than the threshold voltage of the threshold pulse generators 7 and 8, only the positive threshold pulse generator 8 will emit a pulse. This pulse is applied to the AND gate 11 and is of such a length as to embrace the time of occurrence of the next subsequent pulse from divider 13. Consequently, this pulse passes through the AND gate 11. It is delayed by approximately 0.1 microsecond by the delay 14 and is then applied via the buffer 15 to the divider 16 intermediately in time between two consecutive pulses passing through the inhibit gate 10. The divider 16 is, therefore, actuated by an extra pulse and the output of the divider 4 is advanced by 0.2 mirosecond. The pulse from the positive threshold pulse generator 8 is applied to the reversible counter 9 to increase its count by one unit, this representing a phase advance of 1.152 degrees in the signal of 16 kc./s. frequency received at the aerial 1 on the time scale established by the stable oscillator 12.

On starting the phase comparator, the output of the divider 4 will not normally be in phase with the signal of corresponding frequency received by the aerial 1. In such circumstances, successive samples of the output of the filter 5 will be such that a number of pulses are prevented from reaching the divider 16 by means of the negative threshold pulse generator 7 and inhibit gate 10 or, alternatively, a number of extra pulses are applied to the divider 16 by means of the positive threshold pulse generator 8 and the AND gate 11. This process will continue until the phase relationship between the two signals applied to the synchronous detector 3 is such that the output voltage of the filter 5 is approximately equal to the threshold voltage of the threshold pulse generators 7 and 8. When this state is reached, then either the threshold pulse generators 7 and 8 will be quiescent or they will tend to emit pulses alternately so that the circuit hunts about its equilibrium state. When the equilibrium state is as nearly as possible reached, the reversible counter 9 may be reset to zero, or some other desired value, and the phase of the signal received at the aerial 1 relative to the output of the divider 4 will subsequently be continuously monitored by the reversible counter 9.

Although in the foregoing description the reversible counter 9 has been described as monitoring the phase of the signal received at the aerial 1 on the time scale established by the oscillator 12, clearly it may equally be used to monitor the phase of the oscillator 12 on the time scale set up by the signal received by the aerial 1.

The embodiment hereinbefore described with reference to the accompanying drawing is, of course, by way of example only and has been arranged in a form such that the reader may the more easily appreciate the invention. Many variations of the embodiment will occur to those versed in the art. For example, the connections between the negative threshold pulse generator 7 and the inhibit gate 10 and reversible counter 9 may be interchanged with the connections between the positive threshold pulse generator 8 and the gate 11 and reversible counter 9. Further, the chopper 6 and the threshold pulse generators 7 and 8 may be replaced by a circuit known as a Goto twin circuit which consists basically of two Esaki or tunnel diodes connected in series. Such a circuit is described with reference to FIGURE 2, in an article by Goto E. et al. entitled "Esaki Diode High Speed Logical Circuits" in the I.R.E. Transactions on Electronic Computors, vol. EC-9 (March 1960), at page 25. In the present embodiment, the Goto twin circuit would have a signal input to the junction of the two tunnel or Esaki diodes from the filter 5 and would be pulsed in antiphase across the two diodes by suitable outputs from the divider 17.

An adaptation of the Goto twin circuit to the present invention is shown in FIGURE 2. FIGURE 2 shows a phase-splitter transistor Q which is normally *not* conducting. The base of the transistor Q is connected to an output of the divider 17 (FIGURE 1) through a capacitor C1. The collector of the transistor Q is connected to the anode of an Esaki or tunnel diode D1 through a capacitor C2 and a resistor R1 in series. The emitter of the transistor Q is connected to the cathode of an Esaki or tunnel diode D2 through a capacitor C3 and a resistor R2 in series. The cathode of the tunnel diode D1 is connected to the anode of the tunnel diode D2 and the junction of these diodes is connected to the output of the filter 5 (FIGURE 1). The junction of the diodes D1 and D2 is also connected to the gates 10 and 11 and to the reversible counter 9.

The operation of the circuit shown in FIGURE 2 is as follows. The transistor Q is normally not conducting and the voltage across the diodes D1 and D2 is zero. On the receipt of a positive pulse from the divider 17 (FIGURE 1) the transistor Q conducts and generates a voltage pulse across the tunnel diodes D1 and D2. This will generate a positive or a negative pulse at the junction of the diodes D1 and D2 according to whether the output of the filter 5 (FIGURE 1) is positive or negative respectively to the threshold voltage (which is approximately zero volts in this case). A positive pulse will open the AND gate 11 and add unity to the content of the counter 9, while a negative pulse will close the inhibit gate 10 and subtract unity from the content of the counter 9. It will be seen from the foregoing description of FIGURE 2, that the Goto twin circuit performs equivalent functions to the chopper 6 and the threshold pulse generators 7 and 8 combined.

Other possible modifications to the circuit shown in FIGURE 1 are that the divider circuit 17 may be omitted altogether from the circuit of the embodiment hereinbefore described, the chopper 6, or its equivalent, then being driven by an output from the divider 4, if a suitable pulse waveform can be extracted therefrom. Alternatively, the chopper 6, or its equivalent, may be driven from a separate free-running oscillator such as a multivibrator, the output pulses of the threshold pulse generators 7 and 8, or their equivalent, then being retimed to operate the gates 10 and 11 respectively. In this case, the outputs of the threshold pulse generators 7 and 8, or their equivalent, may be fed each to a separate one of two storage triggers which control the gates 10 and 11 respectively. Each storage trigger may then be arranged to be set by an output pulse from its associated threshold pulse generator so as to operate its associated gate, and to be reset by the next subsequent pulse from the divider 13. Furthermore the amplifier 2 is not essential to the invention and may be omitted if the received signal is sufficiently strong. Also, clearly the gates 10 and 11, with their associated circuits for inhibiting pulses and inserting pulses, may be placed at any point on the divider chain 13, 16 (including its input) provided the timing of the operation of the gates 10 and 11 is suitably adjusted. This would merely affect the amount of phase adjustment brought about by the inhibition or insertion of a single pulse.

I claim:

1. A phase measuring circuit comprising a first signal source; a second signal source having an output signal frequency lower than the output frequency of said first signal source; control means including a frequency divider chain connected to said first signal source for providing a signal having the same nominal frequency as said output signal from said second signal source; synchronous detector means having inputs connected to receive an output from said control means and from said second signal source; integrator means connected to the output of said synchronous detector means; first gating means connected to said divider chain for controlling the application of at least one extra pulse to a stage of said divider chain; second gating means connected to said divider chain for controlling the inhibition of at least one pulse applied to said stage; pulse generator means operatively connected to an output of said integrator means, said pulse generator means also being coupled to said first gating means and to said second gating means for controlling said first and second gating means so that at least one extra pulse is applied to, or at least one pulse is inhibited from being applied to said stage according to whether the output from said integrator means is greater than or less than a preselected threshold level; and reversible counter means operatively connected to said pulse generator means for counting in one sense each time an extra pulse is applied to said stage and for counting in the opposite sense each time a pulse is inhibited from being applied to said stage.

2. A phase measuring circuit as claimed in claim 1 wherein said first gating means comprises a coincidence gate connected into a propagation path of said divider chain for selectively duplicating pulses passing through said propagation path, said second gating means comprising an inhibiting gate connected into said propagation path for selectively inhibiting pulses passing through said propagation path, said pulse generator means comprising chopper means connected to said output of said integrator means and to said divider chain for sampling the output of said integrator means at times controlled by said divider chain, a negative threshold pulse generator connected to the output of said chopper means and to said inhibiting gate, and a positive threshold pulse generator connected to the output of said chopper means and to said coincidence gate.

3. A phase measuring circuit as claimed in claim 1 wherein said first gating means comprises a coincidence gate connected into a propagation path of said divider chain for selectively duplicating pulses passing through said propagation path, said second gating means comprising an inhibiting gate connected into said propagation path for selectively inhibiting pulses passing through said propagation path, said generator means comprising two tunnel diodes connected in series, means for applying the output of said integrator means to a junction between said tunnel diodes, means connected to said divider chain for applying pulses across said tunnel diodes, and said junction being connected to said coincidence gate and to said inhibiting gate.

4. A phase measuring circuit as claimed in claim 1 wherein said first signal source comprises a stable oscillator.

5. A phase measuring circuit as claimed in claim 1 wherein said second signal source comprises a wide-band radio-frequency amplifier connected to said synchronous detector, and an antenna connected to the input of the said amplifier.

6. A phase measuring circuit as claimed in claim 4 wherein said second signal source comprises a wide-band radio-frequency amplifier connected to said synchronous detector, and an antenna connected to the input of the said amplifier.

References Cited

UNITED STATES PATENTS 3,138,723 6/1964 Goto _____ 307—88.5
3,164,777 1/1965 Guanella.

WALTER L. CARLSON, *Primary Examiner.*

P. F. WILLE, *Assistant Examiner.*